TOUSSAINT TRUDEAU.
GAS LIGHT TRANQUILIZING GLOBE
No. 117,486. Patented Jul 25 1871
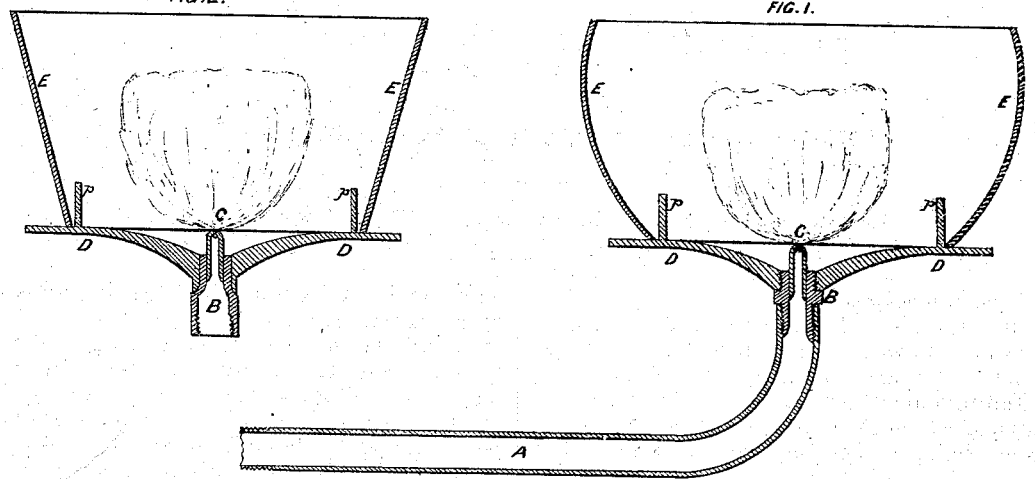
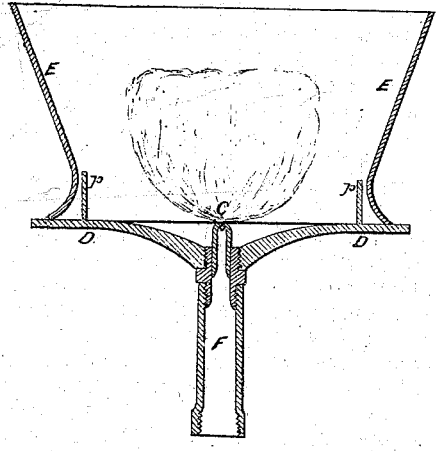
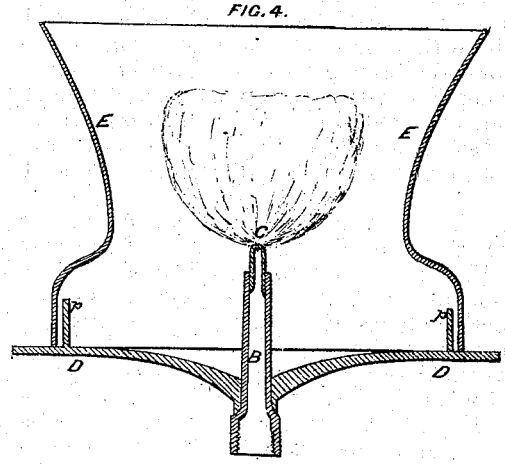
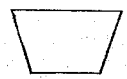 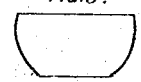 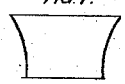 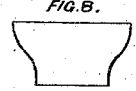 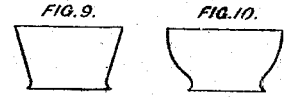 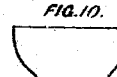
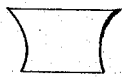 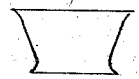 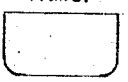 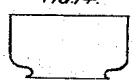 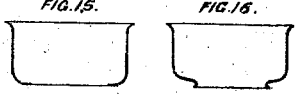 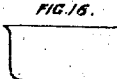
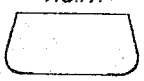 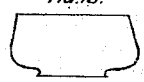 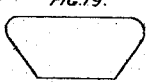 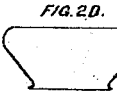 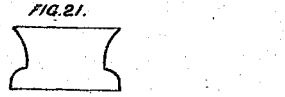
INVENTOR.
Toussaint Trudeau
WITNESSES

*Reissued Nov. 7th 1871.*

117,486

UNITED STATES PATENT OFFICE.

TOUSSAINT TRUDEAU, OF OTTAWA, CANADA.

IMPROVEMENT IN GLOBES FOR GAS-LIGHTS.

Specification forming part of Letters Patent No. 117,486, dated July 25, 1871.

*To all whom it may concern:*

Be it known that I, TOUSSAINT TRUDEAU, of the city of Ottawa, in the county of Carleton and Province of Ontario, Canada, have invented certain Improvements in Gas-Light Draught Apparatus, of which the following is a specification, reference being had to the accompanying drawing.

The object of my invention is to obtain a tranquil gas-flame with illuminating-gas consumed through vertical flat-flame burners by means of a tube or globe having a wide unobstructed opening throughout, with diameters at top and bottom of certain adjusted proportions, the tube or globe being of such limited height that I can avail myself of the elegant forms of the globes at present in use.

Figure 1 is a vertical section of one of my tubes or globes fitted to gas-fixtures of the best form. Fig. 2 is a vertical section of a short burner-holder, such as may be used to support my tubes or globes when applied to gas-fixtures of ordinarily good make and workmanship. Fig. 3 is a vertical section of a long burner-holder to be used when the gas-fixtures are of a defective make. Fig. 4 is a vertical section of a globe continued below the level of the top of the burner. Figs. 5 to 21 are vertical sections of globes or tubes, showing some of the various forms and outlines which may be given them.

A is a pipe conveying gas to the burner. B is the burner-holder. C is a flat-flame burner, such as a fish-tail or a bat-wing. D D is a gallery or supporter, made with three or four arms and upright pins, *p p*. E E is the draught-tube or globe, resting on the gallery D D and retained in position by the pins *p p*. F is the lengthened part of the burner-holder B.

To obtain a tranquil gas-flame as above stated, I use any of the known good vertical flat-flame burners, fitted to any well-made gas-fixtures having wide and free passages, and allowing the gas to flow smoothly to the burner. Over the burner I apply a tube or globe having a wide unobstructed opening throughout, with diameters at top and bottom of certain adjusted proportions, as hereinafter explained and described, the tube or globe being of such limited height that I can avail myself of the elegant forms of the globes at present in use, as well as of new forms. The flame emitted from a naked gas-jet unassisted by a draught apparatus burns with a flickering up-and-down movement very fatiguing to the eyes, and but little improvement is observed when a globe or bell-glass, of the forms made hitherto for use over vertical flat-flame burners, is placed on the light, the flame then oscillating from side to side. This defect is attributable to the fact that these globes, as at present constructed, have lower openings of only about two inches diameter, or have an otherwise obstructed air-duct.

The result of using my improved form of tubes or globes is that the flame is enveloped in a smooth and gently-ascending current of air, which causes the light to burn steadily without flickering or oscillation.

The additional advantages arising from the use of my apparatus are: First, that in an ordinary quiet in-door atmosphere a tranquil light is obtained at very low and consequently economical pressures. Second, that the action of the air is so controlled that the combustion of the noxious part of the gas-flame is more complete. Third, that the wide unobstructed lower opening allows the free passage of light in the direction most required—that is to say, downward—and affords facility for lighting without soiling the globe. Fourth, that the limited height, combined with wide upper opening, removes, I may say, entirely the risk of breakage through the overheating and unequal expansion of the globe or tube when made of glass.

For general use I give to my draught-tubes or globes the following dimensions: Diameter of lower opening, four and one-half inches; diameter of upper opening, six and one-half inches; height, three and one-half inches; and I curve the sides somewhat, as shown in Fig. 1 of the accompanying sheet of drawing which forms part of the present specification.

Notwithstanding my selection of the above tabulated dimensions, which in my opinion should not be very much departed from, the proportions which may be given to my draught-tubes or globes are susceptible of considerable variation, their superiority over the globes at present in use still remaining. Figs. 5 to 21 are examples of outlines which may be chosen. Most of these again may be made so as to present other shapes by changing the proportions of height to breadth.

Great care, however, is necessary in establishing these proportions so as to produce the exact draught needed.

The best and most economical use of the gas is obtained when the draught is at the lowest point consistent with the steadiness of light— that is to say, when the flame is on the verge of flickering and yet does not. I obtain the best results by placing the lower edge of my draught-tubes or globes opposite the lower part of the flame, either at or near the level of the top of the burner. The effect of very low globes or tubes is improved by their being raised above the level of the top of the burner.

When measuring the diameter of any of my globes or tubes, the lower portion of which diverges slightly in a downward direction, as shown in Figs. 9, 10, and 12, I ignore this divergence and take the narrow part of the tube or globe at the point where such divergence commences as the diameter of the lower opening. In cases of globes or tubes extending below the top of the burner, as shown by Fig. 4, I adopt the narrowest diameter of the globe or tube in the immediate vicinity of the top of the burner as the diameter of the lower opening.

I have found by experiment that the force of draught is slightly increased when my globes or tubes are continued to any length within three inches below the level of the top of the burner, and that it is more certain that the steadiness of the flame will not be interfered with by this extension if said extension be made wider than the diameter of the globe or tube at the level of the top of the burner, as shown for example by Fig. 4. Any design for a draught-tube or globe or any form of curve at the top or bottom whereby the flame would be liable to approach within one inch of the tube or globe should be rejected.

My draught-tubes or globes may be manufactured of glass, (clear or ground,) porcelain, paper, pasteboard, thin sheet metal, or other suitable material, and ornamented according to fancy. I prefer the circular form for them, as seen from the top, but they may be of oval shape, if so desired.

The burner should be in the center of the opening of the globe or tube, although it may be placed out of center without inconvenience.

It should be stated that the vibration of gas-light is not only due to defective combustion of the gas, but is often traceable to badly-formed elbows, or an otherwise obstructed passage through the pipe, which prevents the tranquil flow of the gas to the burner. For this reason I prefer applying my draught-tubes or globes to gas-fixtures composed of wide pipes, properly-constructed elbows, and good burners, such as shown by Fig. 1; but when it is required to apply my tubes or globes to gas-fittings not possessing the above qualifications, but, on the contrary, offering a narrow passage for the gas in close proximity to the flame, or having badly-formed elbows, I use a longer burner-holder, as shown by F in Fig. 3. The added burner-holder tube F has the effect of quieting the gas, forming as it does a kind of reservoir, in which the gas, after its passage through the contracted pipes or narrow sharp elbows, may become to some extent tranquilized.

In cases of globes or tubes having lower openings of less than four inches in diameter, the lower edge may be turned outwardly, as in ordinary globes, and as shown by Figs. 14 and 16, and said tubes or globes may be supported by galleries fitted with binding-screws, as in galleries now in general use.

I do not claim as my invention the gas-pipe A; nor the burner-holders B or F; nor the burner C; nor the gallery D D.

I claim—

A shade or globe for gas-burners, having its bottom opening or throat at its narrowest part about two-thirds the diameter of its top opening, and so arranged as to bring the narrowest part of its lower opening on or nearly on a level with the tip of the burner for regulating the in-flowing currents of air and preventing the flickering of the flame, substantially as described.

TOUSSAINT TRUDEAU.

Witnesses:
 HORACE LAPIERRE,
 TOUSSAINT G. COURSOLLES.